United States Patent [19]

Linnebach

[11] Patent Number: 5,082,339
[45] Date of Patent: Jan. 21, 1992

[54] OPTICAL READ-WRITE HEAD WITH DIFFRACTION GRATING STRUCTURE

[75] Inventor: Richard Linnebach, Erdmannhausen, Fed. Rep. of Germany

[73] Assignee: Telefunken Electronic GmbH, Heilbronn, Fed. Rep. of Germany

[21] Appl. No.: 377,405

[22] Filed: Jul. 10, 1989

[30] Foreign Application Priority Data

Jul. 11, 1988 [DE] Fed. Rep. of Germany ....... 3823445

[51] Int. Cl.$^5$ .................. G02B 6/34; G02B 6/12; G11B 7/135
[52] U.S. Cl. ........................... 385/14; 385/37; 359/566; 359/15; 369/109; 369/103
[58] Field of Search ............. 350/96.11, 96.19, 162.17, 350/162.20, 3.7; 250/201.5; 369/103, 109

[56] References Cited

U.S. PATENT DOCUMENTS

| | | | |
|---|---|---|---|
| 3,674,335 | 7/1972 | Ashkin et al. | 350/96.19 |
| 3,674,336 | 7/1972 | Kogelnik | 350/96.12 X |
| 3,908,121 | 9/1975 | Riseberg et al. | 350/96.13 X |
| 3,951,513 | 4/1976 | Masi | 350/96.14 |
| 4,047,795 | 9/1977 | Hughes et al. | 350/96.19 |
| 4,637,684 | 1/1987 | Tomita et al. | 350/96.12 X |
| 4,707,059 | 11/1987 | Ogura et al. | 350/96.19 |
| 4,758,062 | 7/1988 | Sunagawa et al. | 350/96.19 |
| 4,760,568 | 7/1988 | Hine | 350/96.11 |
| 4,799,750 | 1/1989 | Miyawaki | 350/96.11 |
| 4,801,184 | 1/1989 | Revelli | 350/96.19 |
| 4,823,331 | 4/1989 | Yoshitoshi et al. | 350/96.11 |
| 4,861,128 | 8/1989 | Ishikawa et al. | 350/96.19 |
| 4,917,450 | 4/1990 | Pocholle et al. | 350/96.19 |

FOREIGN PATENT DOCUMENTS

| | | |
|---|---|---|
| 3632229 | 5/1988 | Fed. Rep. of Germany . |
| 2601174 | 1/1988 | France . |
| 0123048 | 10/1984 | United Kingdom . |

OTHER PUBLICATIONS

T. Suhara et al., "An Integrated-Optic Disc Pickup Device", *IOOC-ECOC*, 1985, pp. 117-120.
"Integrierte Optikzum Lesen von Optischen Disks", *Laser Magazin*, vol. 5, 1985, p. 75.

*Primary Examiner*—Bruce Y. Arnold
*Assistant Examiner*—David R. Parsons
*Attorney, Agent, or Firm*—Spencer & Frank

[57] ABSTRACT

The invention relates to a holographic optical component and its use for reading the writing/reading heads. This application requires a minimum size and low weight for the holographic optical components. This is achieved in accordance with the invention by arranging a laser element and a grating structure, which is integrated on a waveguide layer and acts as a holographic optical system, on a large-sized surface side of a flat carrier element such that a light beam of the laser element impinges directly on the grating structure and is so converted by the grating structure that it exits from the component.

21 Claims, 2 Drawing Sheets

OPTICAL READ-WRITE HEAD WITH DIFFRACTION GRATING STRUCTURE

BACKGROUND OF THE INVENTION

The invention relates to a holographic optical component having at least one laser element, and a grating structure integrated on a carrier and acting as a holographic optical system, and to the use of such a component.

In the future, optical mass memories will replace more and more conventional magnetic systems such as magnetic disks or tapes for data storage purposes. The reading units required for these consist of a holographic optical component comprising various opto-electronic components such as laser diodes and detectors, and micro-optic components, such as lenses, beam expanders, and beam splitters, acting as the holographic optical system.

A holographic optical component used as a disk head is known from the publication "Lasermagazin", Vol. 5, 1985, page 75 "Integrated optics for reading optical disks", particularly from the illustration given on this page. Here, all components—a laser diode, four photodiodes, and a holographic optical system—are integrated on a monolithically integrated circuit. This chip comprises a waveguide layer arranged on a silicon substrate, and containing four photodiodes as the receiver, and the holographic optical system. The holographic optical system comprises a focussing diffraction grating for coupling the light beam of the laser diode, combined with a double grating structure used as the beam splitter. The laser diode is butt coupled to the silicon substrate. The focussing grating coupler guides the beam of the laser diode onto an optical disk by which the dispersed light reflected back is collected by the same grating and coupled into the waveguide layer. The double grating structure divides the light into two equal parts guided by the waveguide layer onto the two diode pairs so that focus and tracking can be checked. The circuit of 3×12 mm requires a large housing and restricts mobility. Coupling of the laser emission into the chip edge furthermore requires, after separated the wafer into chips, mechanical treatment of this edge which is very labour-intensive, and therefore not conductive to economical production. The construction of a holographic optical component of this type is a very complicated technology, and therefore very expensive and ill-suited for mass production.

In addition, a holographic optical component is known from EP-PS 0 123 048, where a laser diode and a photodetector are arranged on a substrate element. A coherent light beam of the laser passes through a first hologram and is deflected by the latter such that it impinges via a beam splitting hologram on a second focussing hologram, which deflects the beam and focusses it on a recording medium. The light beam reflected by the recording medium is again deflected through the second hologram, and separated by the beam splitting hologram from the light beam generated by the laser diode and deflected through a third hologram onto the detector. A drawback of this arrangement is in particular the use of four holograms that necessitates adjustments of each one.

SUMMARY OF THE INVENTION

The object of the invention is to provide a holographic optical component which is of small size, inexpensive to manufacture, and simple to adjust.

The above object is achieved according to the invention by a holographic optical component having at least one laser element, a waveguide layer integrated on a semiconductor body, a grating structure, which acts as a holographic optical system, integrated on the surface of the waveguide layer, at least one photodiode integrated in the waveguide layer and a carrier element on which the laser and the semiconductor body are mounted; and wherein, the laser element, and the semiconductor body are arranged on one surface side of the carrier element, in such a way, that a first light beam of the laser element impinges directly on the grating structure and after being diffracted from the grating structure exits from the component as a second light beam. The advantage obtained with the invention is in particular that the optical elements can be preset such, that the light path of the laser emission from the position of the laser to the impingement on the grating structure acting as a holographic optical system (hologram) can be kept as short as the spacing necessary for the mounting area of the elements, thereby permitting an extremely small construction size. This small size naturally results in a low inert mass, so that the component can be employed to advantage in mobile parts. In addition, simple active adjustment of the laser position is possible, so that for example the maximum light efficiency or the focus position or focus quality can be used as adjustment criteria in a focussing grating structure.

In a first embodiment, a cover designed as a housing cap is provided that forms together with the carrier element the housing of the component, where the light beam of the laser element reflected off the grating structure exits from this cover. In an advantageous embodiment of the invention, the cover contains in the passage area of the light beam a window transparent to light. In view of the advantageous arrangement of the laser element and the holographic optical system on the carrier element, no restrictions result for the design of the housing, thereby preserving the low dimensions of the component. Useful embodiments of the invention are described in the sub-claims.

BRIEF DESCRIPTION OF THE DRAWINGS

The invention will now be described in greater detail on the basis of embodiments shown in the drawings, in which.

In the figures, corresponding parts have been numbered identically.

DESCRIPTION OF THE PREFERRED EMBODIMENTS

Figure 1:
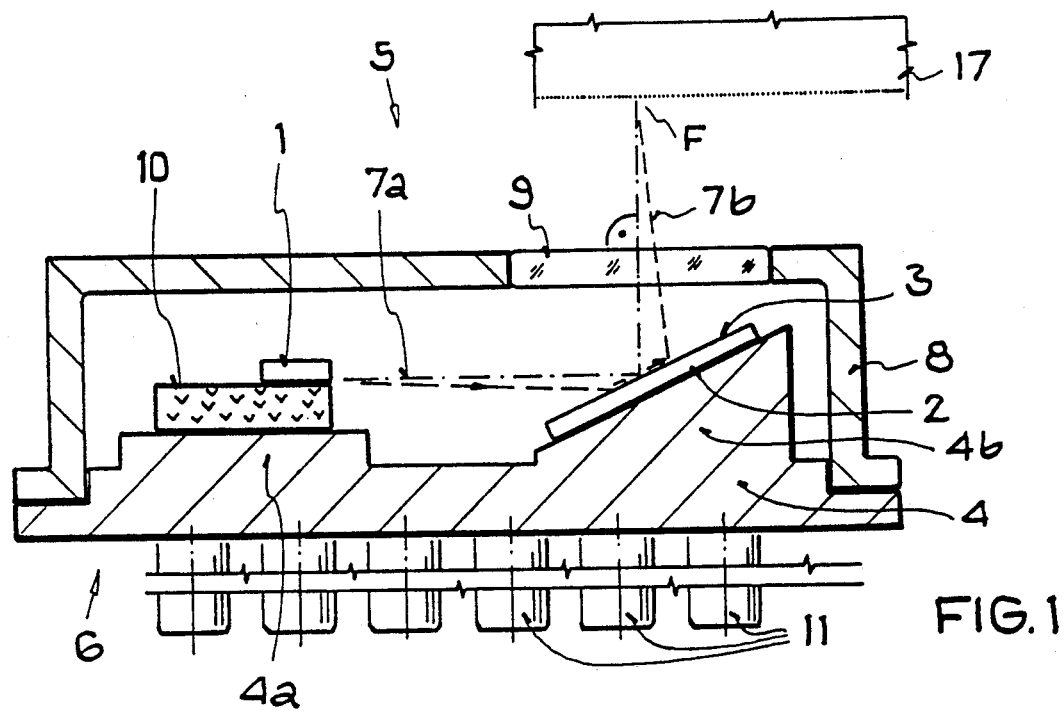
FIG. 1 shows a schematic section through an embodiment in accordance with the invention of a holographic optical component.

The holographic optical component in accordance with the invention in FIG. 1 shows a carrier element 4 on whose one surface side 5 are arranged a laser element 1 and a carrier 2 of semiconductor material carrying the grating structure 3 acting as a holographic optical system (hologram or holographic grating). This surface side 5 of the carrier element 4 is here designed that both the laser element 1 and the semiconductor element 2 carrying the holographic optical system are each on a leveled or inclined base 4a or 4b. In addition, a heat sink 10 is arranged between the laser element 1 and the base 4a so that the laser element emits a light beam 7a horizontal in relation to the surface side 5 of carrier element 4, this light beam impinging directly on the grating structure 3 on the semiconductor element 2. Here, the plane of the grating structure 3 is inclined against the base plane 6 of the carrier element 4 that the optical axis of the light beam 7b diffracted by the grating structure 3 i.e., perpendicular, is vertical to the base plane 6. In addition, the grating structure 3 is designed like a focussing diffraction grating, so that a focus F is generated outside a cover 8 that is in the same plane as a storage medium 17. The cover 8 designed as a housing cap hermetically seals, with the edge of the carrier element 4, the laser element 1 and the semiconductor element 2 carrying the grating structure 3. The top surface of the cover 9 is aligned parallel to the base plane 6 of the carrier element 4 and has in the passage area of the beam 7b a window 9 transparent to light. The optical axis of the reflected light is therefore vertical i.e., perpendicular to the optical window 9, so that adjustment of the laser element 1 can be actively implemented with a dummy window in order to take into account the optical path-altering property of the window 9 representing a plane-parallel plate. Again, this arrangement of the optical axis has the advantage that mechanical tolerances for closing the housing acting parallel to the window 9 are uncritical. The window 9 made of glass is designed plane-parallel with a thickness of approx. 0.3 mm. The flat carrier element 4 can be designed in either rectangular or circular form with a thickness of approx. 3 mm, so that the component fitted with cover 8 is in cylindrical form with a diameter of approx. 15 mm and a height of approx. 8 mm, or in block form with a length of approx. 15 mm, a width of approx. 10 mm, and a height of approx. 8 mm. On the second large-sized exterior surface side 6 of the carrier element 4 are connecting pins 11 for connecting the opto-electronic elements.

Figure 2A:
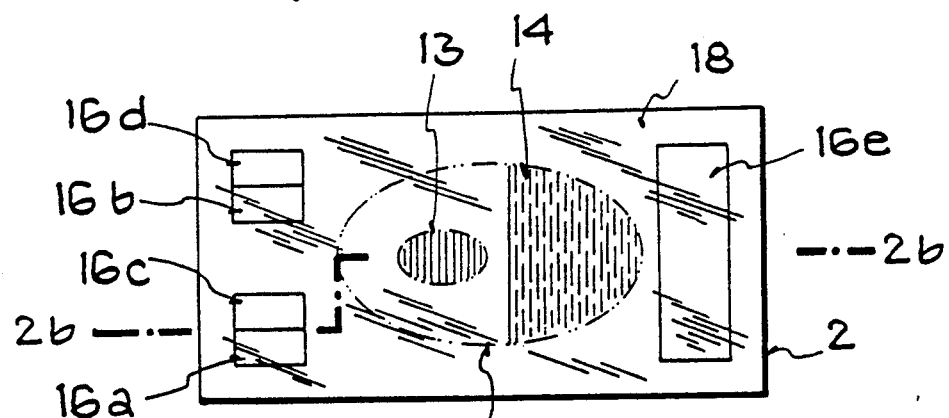
FIGS. 2a and 2b show schematically a plan view and a sectional view of a holographic optical system.
Figure 2B:
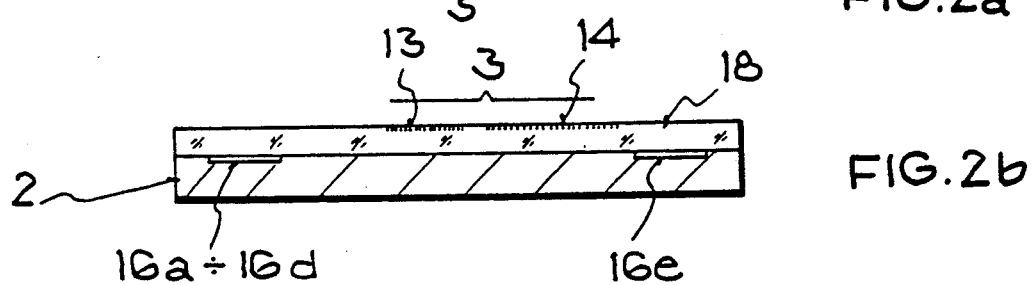

The holographic optical component can be used advantageously to read optical storage media. To do so, the light beam reflected off the storage medium 17 is again coupled into the window 9 and onto the grating structure 3 and there passed to photodiodes, so generating tracking error signal, focus error signal, and data signal. FIG. 2a is a schematic representation of a semiconductor element 2 having a grating structure 3 designed as a diffraction grating and having photodiodes 16a to 16e operating as detectors. The diffraction grating 3 comprises the beam expander 13 and the beam splitter 14, which also serves to couple and decouple the light. The light beam 7a generated by the laser element 1 impinges on the beam expander 13, used to reduce the distance between the laser element 1 and the grating structure 3 as well as to illuminate the diffraction grating 14. Then the converted light beam 7b is debunched through the diffraction grating 14 and focussed on the storage medium 17. The reflected light beam is also collected by the diffraction grating 14 and divided into two equal parts by the beam splitting property, and passed to the two photodiode pairs 16a, 16c and 16b, 16d, respectively. With photodiode 16e, the light generated by the laser element 1 can be detected and used for power control. FIG. 2b shows a section through the semiconductor element according to FIG. 2a along the line 2B-2B. Here, the photodiode 16a to 16e are integrated in a semiconductor element 2 while the diffraction grating 13 and 14 are generated in a light-carrying layer 18. The semiconductor element 2 made from silicon has a thickness of approx. 350 $\mu$m and a size of approx. 3×5 mm. The waveguide layer 18 has a thickness of approx. 0.5 $\mu$m and is deposited using evaporated $Al_2O_3$ onto a separation layer of thermally oxidized $SiO_2$ of 3 $\mu$m thickness.

Figure 3:
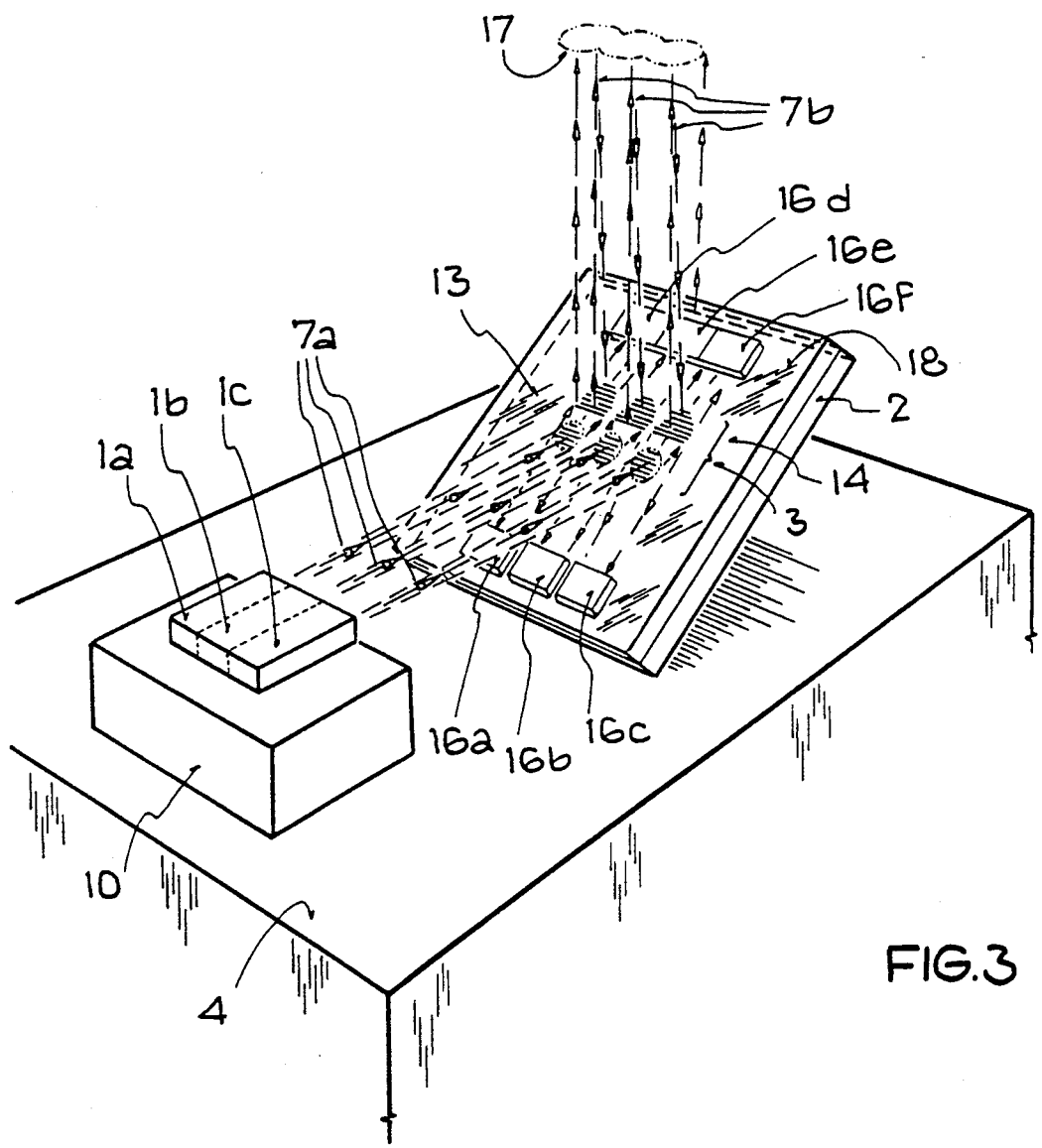
FIG. 3 shows a schematic view of a further embodiment of the invention.

FIG. 3 shows a further embodiment of the holographic optical component in accordance with the invention—the cover 9 is not shown—in which three laser elements 1a, 1b, and 1c are arranged on the heat sink 10. The grating structure 3 acting as a holographic optical system comprises in turn two areas—one the beam expanders 13 and second the diffraction gratings 14—both serving to bunch and debunch the light. The photodiodes 16a to 16f are arranged on the semiconductor substrate 2. The light beams reflected by the storage medium 17 are divided by the diffraction gratings 14 in the light-carrying layer 18 onto the diodes 16a to 16c in order to generate tracking and focus error signals and also the data signal. Diodes 16d to 16f are used to regulate the power of the laser elements.

The holographic optical components in accordance with the embodiments described above each have a holographic optical system generating a focus point outside the housing. A component of this type can therefore be used for a reader heads in optical disks or for a writing/reading head for magneto-optical data memories. The holographic optical system can however also be designed to a different light dissipation characteristic, for example collimating or diverging, so that further applications, for example intelligent sensors, are conceivable. Finally, image error corrections can be taken into account or the intensity profile of the light beam can be influenced.

What is claimed is:

1. In an optical component having at least one laser element, a waveguide layer integrated on a semiconductor body, a grating structure acting as an optical system, with said grating structure being integrated on said waveguide layer, and at least one photodiode integrated in the semiconductor body; the improvement wherein said laser element and said semiconductor body are arranged on a single surface side of a carrier element such that a first beam of said laser element impinges directly on said grating structure; and wherein said first light beam diffracted from said grating structure exits from the component as a second light beam.

2. An optical component according to claim 1, wherein a cover designed as a housing cap is provided and together with said carrier element forms the housing of the component, and wherein the second light beam diffracted from the grating structure exits from said housing through said cover.

3. An optical component according to claim 2, wherein the cover contains a window transparent to light through which the second light beam exits.

4. An optical component according to claim 3, wherein the second light beam passes perpendicularly through the plane of the window.

5. An optical component according to claim 2, wherein the housing is hermetically sealed.

6. An optical component according to claim 1, wherein the optical axis of the second light beam diffracted from the grating structure is perpendicular to the base plane of the carrier element.

7. An optical component according to claim 1, wherein the laser element is arranged on a heat sink located on the carrier element.

8. An optical component according to claim 1, wherein connecting pins for said laser and said photodiode are provided on the base plane of the carrier element.

9. An optical component according to claim 1, wherein the first light beam propagates in said waveguide layer.

10. An optical component according to claim 9, wherein said grating structure includes a first grating structure portion for coupling the first light beam into the waveguide layer.

11. An optical component according to claim 10, wherein said grating structure further includes a second grating structure portion for producing the second light beam and for coupling said light beam out of the waveguide layer.

12. An optical component according to claim 11, wherein the first grating structure portion is designed such that the first light beam illuminates the second grating structure portion.

13. An optical component according to claim 11, wherein the second grating structure portion is a focussing diffraction grating for decoupling the light beam from the waveguide.

14. An optical component according to claim 11, wherein the second grating structure portion is a collimating diffraction grating for decoupling the light beam from the waveguide layer.

15. An optical component according to claim 11, wherein the second grating structure portion is a diverging diffraction grating for decoupling the light beam from the waveguide layer.

16. An optical component according to claim 11, wherein the second grating structure portion modifies the intensity profile of the second light beam.

17. An optical component according to claim 11, wherein the second grating structure portion produces several light beams simultaneously.

18. An optical component according to claim 11, wherein said component is disposed in a housing; and the second grating structure is provided for additionally coupling a light beam entering the housing to said waveguide layer.

19. An optical component according to claim 18, wherein the second grating structure portion is designed such that a coupled light beam is distributed between at least two of said photodiodes.

20. An optical component according to claim 10, wherein the first grating structure portion provides correction for optical errors of the first light beam.

21. An optical reading and/or writing head for optical memories comprising an optical component having at least one laser element, a waveguide layer integrated on a semiconductor body, a grating structure acting as an optical system and integrated on a surface of said waveguide layer, at least one photodiode integrated in the semiconductor body, and a carrier element; and wherein: said laser element and said semiconductor body are mounted on a single surface side of said carrier element such that a first light beam emitted by said laser element impinges directly on said grating structure and after being diffracted from said grating structure exits from the component as a second light beam; said grating structure includes a first grating portion on which said first beam impinges and a second grating portion for producing said second light beam; said first grating portion is a beam expander for illuminating said second grating portion with said first light beam; and said second grating portion is a focussing diffraction grating for focussing said second light beam at a focal point and a beam-splitter for coupling reflected light of said second light beam into said waveguide layer and to said at least one photodiode.

* * * * *